Sept. 24, 1968　　　　　M. D. BEHRENS　　　　　3,402,550
OVER TEMPERATURE PROTECTION DEVICE FOR A CATALYTIC
MUFFLER FOR EXHAUST EMISSIONS CONTROL IN AN
INTERNAL COMBUSTION ENGINE SYSTEM
Filed May 14, 1964　　　　　　　　　　　　　　2 Sheets-Sheet 1
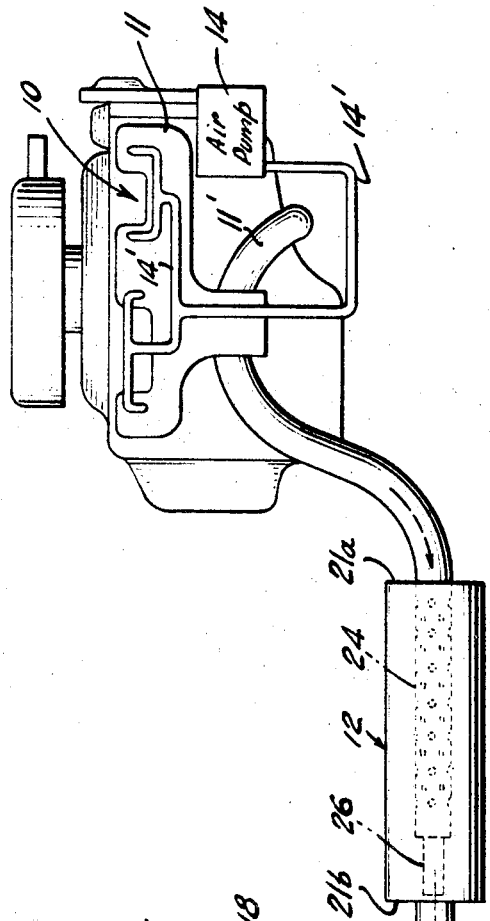
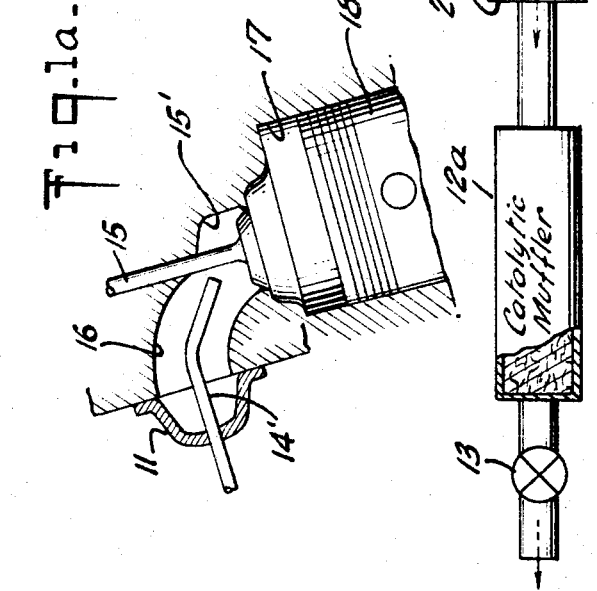
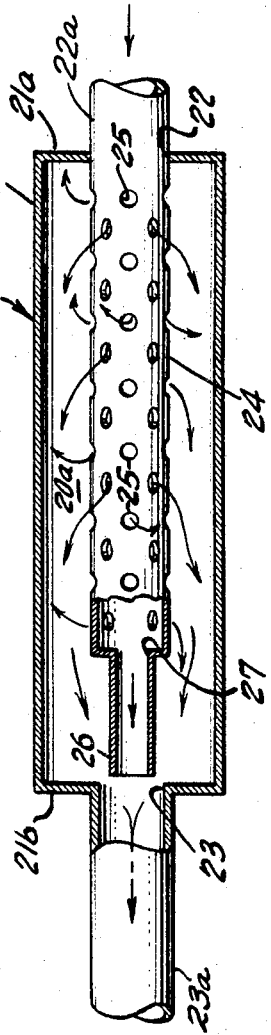

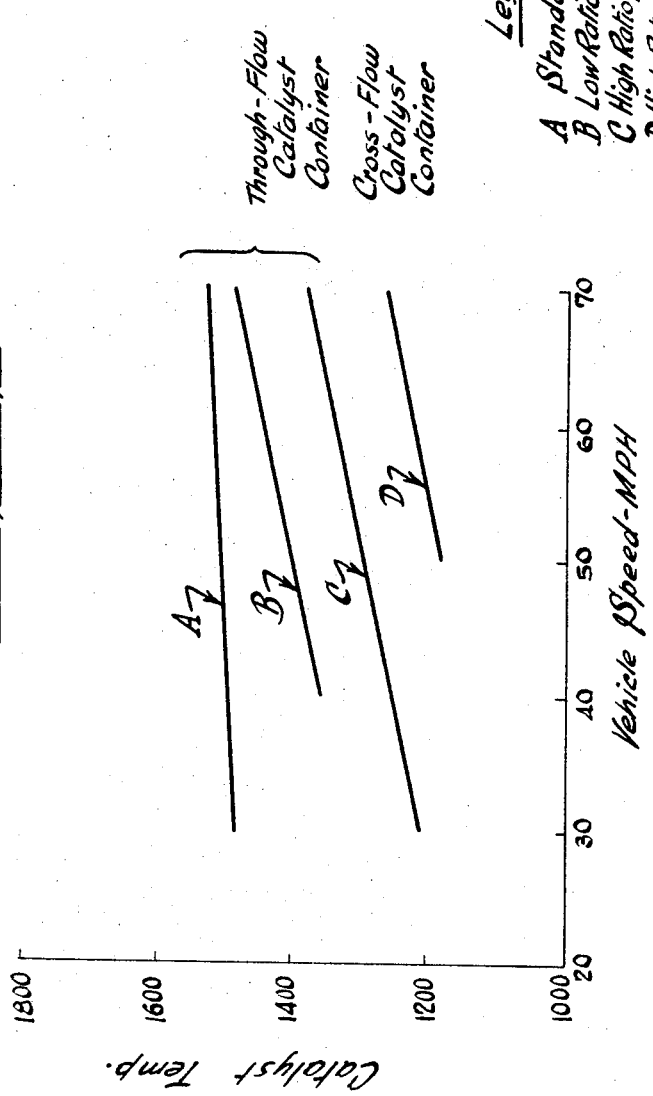

United States Patent Office 3,402,550
Patented Sept. 24, 1968

3,402,550
OVER TEMPERATURE PROTECTION DEVICE FOR A CATALYTIC MUFFLER FOR EXHAUST EMISSIONS CONTROL IN AN INTERNAL COMBUSTION ENGINE SYSTEM
Milton D. Behrens, Hopewell Junction, N.Y., assignor to Texaco Inc., New York, N.Y., a corporation of Delaware
Filed May 14, 1964, Ser. No. 367,336
15 Claims. (Cl. 60—30)

ABSTRACT OF THE DISCLOSURE

An apparatus for high temperature protection of a catalytic muffler in combination with the introduction of additional air into the exhaust gases of an internal combustion engine to further promote reaction with the exhaust products of combustion in the annular chamber of the over temperature protection apparatus positioned upstream of the catalytic muffler.

---

This invention relates generally to the operation of internal combustion engines, and in one specific embodiment, to an apparatus for over temperature protection of a catalytic reactor used in the control of exhaust emissions therefrom by eliminating combustible compounds from the products of combustion of an internal combustion engine.

Internal combustion engines generally operate at fuel-air mixtures which are richer than stoichiometric, with the result that in the exhaust products of combustion, there are considerable residual combustible compounds including carbon monoxide, hydrogen and hydrocarbons. For automotive exhaust emissions control, it is known that additional air should be added to such exhaust products to produce an overall fuel-air ratio in the exhaust system at least stoichiometric and preferably slightly leaner, and means must be provided for promoting the reaction of the combustible compounds in the exhaust with air to the eventual end products of water and carbon dioxide.

The introduction of air as an oxidizing fluid into the exhaust manifolds of internal combustion engines to convert the carbon monoxide in the engine exhaust products to carbon dioxide is known in the art. Such an oxidizing fluid is introduced adjacent the downstream face of the exhaust valve, where the temperature is sufficiently high so that further combustion can occur spontaneously. Means are also known for mixing and reacting additional air with the combustible compounds in the exhaust products in the form of catalytic reactors.

Accordingly, it is an object of my invention to provide an improved means for greatly reducing, if not eliminating for all practical purposes, combustible compounds in the exhaust products of combustion from an internal combustion engine.

It is another object of this invention to provide an improved apparatus for the substantially complete oxidation of the combustible compounds in the exhaust gases.

Still another object of my invention is to provide a simple but effective over temperature protection device for a catalytic reactor used in an automatic exhaust emissions control system in an internal combustion engine for the exhaust products of combustion thereof.

These and other objects, features and advantages of the invention will become apparent from the following description and claims, when read in conjunction with the accompanying drawings wherein:

FIG. 1 is a diagrammatic showing of an internal combustion engine employing my invention;

FIG. 1a is a way of providing additional air adjacent and downstream an exhaust port;

FIG. 2 is a longitudinal cross section, partly in elevation, of the over temperature protection apparatus; and FIG. 3 is a graphical showing of the effect of the over temperature protection apparatus on the catalyst temperature.

The objects of my invention are achieved by introducing additional air into the exhaust gases of an internal combustion engine for further reaction with the products of combustion exhausted therefrom and promoting the reaction of air and the residual combustibles therein and removing other undesirables by using an over temperature protection apparatus with a catalytic reactor construction.

An engine driven pump has been found feasible for providing additional air to the engine exhaust system. The mixture of additional air and exhaust products of combustion undergoes some combustion prior to delivery to a chamber where more mixing and combustion occur. In some noncatalytic combustion types, such a chamber is known as a direct flame afterburner where ignition is initiated by positive means, such as a glow plug or a spark plug.

Catalytic reaction chambers or reactors are characterized by the features that (a) a catalyst is impregnated on a ceramic or refractory base in the form of bricks, spheres, pellets, or porous material, and (b) the exhaust gases plus additional air to complete the combustion thereof are introduced into the reaction chamber packed with the catalyst for mixing and reacting as they pass over and through the catalyst bed.

The principal advantages of the catalytic reactor over the direct flame afterburner are the lower reaction temperatures and the elimination of the extra fuel consumption. Some disadvantages are that the typical catalytic reactor is large and with a large thermal mass, a relatively long time of start-up operation is needed to warm up the catalyst to its activation temperature; and while some catalysts may resist lead poisoning, they tend to break up and become ineffective because of combined thermal and mechanical shock from "stop and go" driving and fluctuating load characteristics of automotive service, and from pulsating gas flow and mechanically induced vibrations. Also, deposits from the products of combustion may coat the catalyst and so impair its action.

Referring to FIG. 1 of the drawings, there is disclosed the general showing of an apparatus or engine system wherein the invention is used, consisting basically of an internal combustion engine at 10, with an exhaust system including an exhaust manifold at 11, leading to my novel over temperature protection device 12, for a catalytic muffler indicated at 12a. There is disclosed at 13, a diagrammatic showing of a valve for regulating exhaust back pressure, shown located downstream of the catalytic muffler. At 14, there is disclosed an engine driven air pump for providing additional air to the exhaust system of the engine, in the manner shown specifically in FIG. 1a, through inlet tubing 14′.

As known in the art, additional air is provided adjacent the downstream face of the exhaust valve 15, FIG. 1a, which closes the exhaust port at 15′ in the cylinder head 16 of an internal combustion engine, having a cylinder located at 17 and a piston therein at 18. The exhaust pipe at 11′, FIG. 1, leads from the exhaust manifold of the other bank of engine cylinders, as in the case of V-type engines, and brings along the exhaust gases and additional air in various stages of reaction.

In the area of air introduction, the temperatures of the exhaust gases vary from 1400° F. to 2400° F., depending upon engine operating conditions, so that in the presence of additional air, the combustible compounds in the products of combustion can ignite spontaneously. At low and medium load conditions, it has been found that to promote a more complete combustion of the residual combustibles, additional back pressure should be imposed on the gases in the exhaust system in addition to that imposed by the conventional muffler and/or catalytic reactor construction. Normally, the exhaust back pressure imposed by the conventional muffler structure at engine idling conditions is generally zero, and under conditions of wide open throttle operation (at approximately 70 m.p.h. and higher) may amount generally to as much as 10–15 p.s.i., due largely to the large mass volume of gases, as well as to their inertia, passing through the muffler.

In my copending and coassigned application for patent for an Internal Combustion Engine System for Exhaust Emissions Control, Ser. No. 335,122, filed Jan. 2, 1964, the disclosure of which is incorporated herein by this reference, the introduction of additional air and the raising of the exhaust back pressure to further the reaction with the exhaust products of combustion is set forth. Therein is disclosed that the achieve the improved afterburning conditions, as a generalization, the excess back pressure should be greater than that imposed by the ordinary muffler construction, and should be greater than 1.05 times the atmospheric pressure to attaim at least minimum control standards of reduction of hydrocarbon concentration.

Certain present statutory requirements for reducing pollutants contributing to air pollution include that the hydrocarbon concentration of the average automotive exhaust gases be reduced to an average of 275 p.p.m., and carbon monoxide concentration to an average of 1.5%. To meet such present statutory requirements it is known that the exhaust back pressure ratio should be about ⅛ greater than the atmospheric pressure.

Further, there is disclosed in my above cited copending application for patent that with the use of elevated exhaust back pressure in promoting the exhaust system afterburning reaction, with the addition of air, the ratio of the actual fuel-air mixture to the stoichiometric fuel-air mixture in the exhaust system, being indicated as γ, varies from about 0.85 to about 1.25. The addition of air is continuous and is provided the exhaust system at a pressure sufficient for free flow thereto. Too great an amount of additional air leads to lowering of the temperature in the exhaust system so that the extent of additional burning is decreased and the cost of pumping is increased. When necessary, the additional air can be preheated, too.

While the concentration of the combustible compounds in the exhaust products of combustion can be reduced satisfactorily to meet theminimum conditions set by certain present ordinances, it is possible to reduce further the unburned hydrocarbon concentration by the use of a catalytic reactor positioned in or adjacent the muffler for a further afterburning reaction. Such a catalytic reactor could provide not only for the reduction of the hydrocarbon concentration but also control the amounts of other gases, such as the oxides of nitrogen, which are included in the noxious materials leaving the exhaust system after-burning reaction. The introduction of additional air into the exhaust system adjacent an exhaust port causes combustion of hydrocarbons and carbon monoxide and raises the temperature in this area higher than normal. This higher temperature then causes even more complete or greater combustion of hydrocarbons and carbon monoxide in the area of the exhaust port and manifold. Thus, hydrocarbons and carbon monoxide which undergo combustion in the exhaust manifold area obviously reduce the load on the catalytic reactor. To achieve such results, FIG. 1 discloses diagrammatically a basic structure by which the exhaust back pressure is maintained at the required level to promote the exhaust system afterburning, with the valve at 13 to control the back pressure on the exhaust gases flowing through the catalytic muffler at 12a. The catalytic muffler is connected to the exhaust manifold 11 by an exhaust pipe of sufficient volume and optimum length; short enough that following cold starts and during idle and deceleration, the exhaust gases will be hot enough to insure rapid warm up of the catalyst, thereby resulting in effective oxidation of the hydrocarbons and CO in the catalytic muffler and yet far enough away so that during cruise and high speeds the exhaust gases will have time for combustion and cooling prior to their entry into the catalytic muffler thereby decreasing the heat load on the catalyst.

Referring to FIG. 2, the over temperature protection device 12 for the catalytic muffler comprises an outer cylindrical conduit member 20, with end portions 21a and 21b, having respectively an inlet 22 and an outlet 23 therein. Both the inlet and the outlet have the same diameters as the discharge pipe 22a leading to the inlet 22 from the piping of the exhaust system and the discharge pipe 23a leading from the outlet of the device, to the downstream piping of the exhaust system.

Spaced within the outer conduit member 20 is an inner cylindrical member or foraminous conduit 24 thereby defining a substantially annular chamber 20a within the housing provided by the outer conduit member 20. This inner member, joined to the outer member at the inlet 22, contains perforations 25 throughout its length within the housing and has the same diameter as the exhaust system piping, ending in a nozzle 26 with an abrupt reduction, with the orifice 27 having an areal dimension less than the sum total of the perforations 25. The nozzle 26 is a cylindrical imperforate member ending adjacent the outlet 23 and has a smaller diameter than the outlet, to form an annular restriction thereat. The exhaust gases enter the device 12 through the inlet 22, passing through the perforations 25 into the annular chamber 20a within the housing 20, where additional reaction between the mixture of additional air and exhaust gases occurs, and also through the nozzle 26, for direction of the mixture into the outlet 23.

While the exact physical and chemical phenomena which occur within such a device have not been determined, it is postulated that additional mixing and reaction within the air-exhaust gases mixture occur within the annular chamber, and that because of the turbulence occurring as the mixture passes through the perforations and the abrupt reduction at the nozzle, the flow restriction permits further reaction of the combustibles therein, primarily CO, thus reducing the amount of reaction which must occur when the exhaust gases reach the catalyst muffler.

In my copending application for patent for a Catalytic Muffler Construction For Exhaust Emissions Control In An Internal Combustion Engine, Ser. No. 356,797, filed Apr. 2, 1964, the disclosure which is incorporated herein by this reference, there are disclosed several ways in which catalyst material is prepared for inclusion in a catalytic muffler. Briefly, the catalyst material is formed from a substrate comprising an aggregate of stainless steel wool, upon which is deposited an adherent film of alumina, preferably by contacting the substrate with a solution of an alkali metal aluminate, and after processing, the alumina coated substrate is impregnated with one or more oxidation catalysts. As disclosed in this latter cited application, a copper oxide-copper chromite complex is useful as a catalyst.

Because the copper oxide-copper chromite complex is an excellent oxidation catalyst for CO, and because CO emissions during wide-open-throttle engine operation are high, severe high temperature conditions in the catalyst bed have been found to exist during high output engine operations. FIG. 3 shows graphically the effect of the enlarged volume exhaust system afterburner on catalyst temperature, with the data being obtained under wide-open-throttle conditions. As shown, the temperature rise uisng the larger volume ratio exhaust system materially reduces the temperature of the catalyst. The large volume exhaust system afterburner is advantageous for use with the smaller engines as used in present day domestic compact automobiles and where road operations are at a high engine load factor with considerable rich mixture operation and high concentrations of combustibles. For proper over temperature protection of the catalytic muffler, the ratio of the enlarged exhaust system from the exhaust valve when in closed position up to the catalytic muffler to the engine displacement should range from 2.0 to 3.4.

Thus, there has been shown and described a device by which the catalyst material in a catalytic muffler is protected from severe high temperature operating conditions. No warm-up period is required for operation of the disclosed automotive exhaust emissions control system as would be required for the critical operation of a catalytic muffler, since proper temperature for reaction between the exhaust products and additional air are obtained either at the exhaust ports or in the exhaust system adjacent the catalytic muffler immediately upon starting of the internal combustion engine.

Other modifications and variations of the invention, as hereinbefore set forth, may be made without departing from the spirit and scope thereof, and therefore, only such limitations should be imposed as are indicated in the appended claims.

I claim:

1. An over temperature protection device for a catalytic reactor for reducing the amount of residual combustibles in exhaust gases comprising a casing with an inlet and an outlet for said exhaust gases and a foraminous conduit extending through said inlet into said casing in spaced relationship therewith to define a chamber and having perforations throughout its length within said casing, ending in an orifice adjacent and upstream said outlet thereby providing passages through said device for said exhaust gases, said conduit being abruptly reduced prior to said orifice.

2. In a system for treating exhaust gases including a catalytic reactor for removal of pollutants from said gases, an over temperature protection device for said reactor positioned upstream thereof in said system and comprising a pair of conduits positioned in concentrically spaced relationship to each other to define a chamber having an inlet and an outlet, the inner conduit being abruptly reduced and ending in an orifice adjacent and upstream said outlet and having perforations throughout its extent within the outer conduit to permit passage of said gases into said chamber prior to exit via said outlet.

3. In the system as defined in claim 2, said outlet of said chamber being equal in area to that of said inlet thereinto, said inner conduit having an imperforate member leading from said orifice thereof and ending adjacent said outlet of said chamber.

4. A large volume exhaust system afterburner for interconnection into an exhaust system leading from an exhaust port of an internal combustion engine including a catalytic reactor for reducing pollutants in the exhaust emissions of said engine comprising a chamber defined by an outer conduit having a substantially greater diameter than that of the exhaust system piping and with an inlet and an outlet, and an inner compound cylindrical conduit extending into said outer conduit from said inlet comprising an inlet perforated cylinder having substantially the same diameter as that of exhaust system piping and an outlet imperforate cylinder of substantially smaller diameter than the exhaust system piping, said inlet perforated cylinder extending through the greater extent of said chamber and being perforated throughout its extent therewithin, said outlet imperforate cylinder ending adjacent and upstream said outlet of said enlarged chamber, the ratio of the volume of the exhaust system between said exhaust port and said outlet of said enlarged chamber to the engine displacement being in the range of from 2.0 to 3.4.

5. Means for reducing the amount of residual combustibles in the products of combustion from a cylinder of an internal combustion engine comprising, an exhaust system leading from an exhaust port of said cylinder, and means for providing air in at least stoichiometric ratio adjacent and downstream said exhaust port for combustion of said residual combustibles among the exhaust products in said exhaust system, said exhaust system including a large volume afterburner construction located downstream said means for providing air, and having a volume greater than that of the conventional exhaust system so that the ratio thereof to the engine displacement is in the range of from 0.7 to 3.4, said afterburner construction comprising a housing with an inlet and an outlet, and a perforated member joined to said housing and extending through said inlet thereinto in spaced relationship therewith to define a chamber, said member being abruptly reduced and ending in an orifice adjacent and upstream said outlet and having perforations throughout its length within said housing, thereby providing communication with said chamber through said orifice and perforations.

6. In the means as defined in claim 5, means for controlling the back pressure in said exhaust system comprising valve means positioned downstream from said afterburner construction of said exhaust system functioning to restrict mass flow at the lower speeds above idle thereby to maintain a back pressure higher than the normal back pressure of said exhaust system without said valve means and opening at the higher speeds and mass flow rates when said normal back pressure without said valve means is above the maintained back pressure at said lower speeds above idle.

7. In the means as defined in claim 6, said exhaust system including a catalytic muffler positioned downstream said afterburner construction.

8. In the means as defined in claim 7, said catalytic muffler incorporating a catalyst material comprising an oxidation catalyst, said oxidation catalyst comprising a copper oxide-copper chromite complex.

9. In the means as defined in claim 8, said catalyst material comprising a substrate with an adherent film of alumina, said oxidation catalyst being adherent thereon.

10. In an internal combustion engine having a cylinder, means for reducing the amount of residual combustibles in the products of combustion from said cylinder comprising an exhaust system leading from an exhaust port of said cylinder, means for providing air in at least stoichiometric ratio adjacent and downstream of said exhaust port for combustion of said residual combustibles among the exhaust products in said exhaust system, and means for controlling the back pressure in said exhaust system comprising valve means positioned therein downstream from said exhaust port functioning to restrict mass flow at the lower speeds above idle thereby to maintain a back pressure higher than the normal back pressure of said exhaust system without said valve means and opening at the higher speeds and mass flow rates when said normal back pressure without said valve means is above the imposed back pressure, said exhaust system including a large volume afterburner construction positioned between said means for providing air and said means for elevating the back pressure in said system and comprising an exhaust pipe of increased diameter over that of conventional automotive design so that the volume relationship of said exhaust system to the engine displacement is in the range of from 2.0 to 3.4, said exhaust pipe of increased diameter defining a casing with an inlet and an outlet for interconnection into said system, and a perforated conduit housed within said casing extending from said inlet and ending adjacent and upstream said outlet and being abruptly reduced prior thereto whereby passage for the air-exhaust products mixture is provided through said exhaust pipe into said system.

11. In the internal combustion engine as defined in claim 10, said exhaust system including a catalytic muffler positioned downstream said afterburner construction and upstream said valve means.

12. Apparatus for reducing the amount of pollutants in the products of combustion from an internal combustion engine having a cylinder with an exhaust port and including an exhaust system leading from said exhaust port, comprising, in combination, means for providing air in at least stoichiometric ratio to the products of combustion having pollutants adjacent and downstream said exhaust port, an exhaust pipe afterburner construction and a catalytic muffler positioned in successive downstream relationship to each other in said exhaust system for removal of said pollutants, said afterburner construction comprising a chamber defined by a pair of spaced members having an inlet and an outlet for interconnection into said exhaust system, said inlet including a perforated member positioned within the outer member and having perforations thereon throughout its extent therewithin to provide communication into said chamber, and being abruptly reduced prior to said outlet the volume ratio of the exhaust system upstream said catalytic muffler to the engine displacement being in the range of from 2.0 to 3.4.

13. In the apparatus as defined in claim 12, said catalytic muffler incorporating a catalyst material comprising an oxidation catalyst, said oxidation catalyst comprising a copper oxide-copper chromite complex.

14. In the apparatus as defined in claim 13, said catalyst material comprising a substrate with an adherent film of alumina, said oxidation catalyst being adherent thereon.

15. In the apparatus as defined in claim 12, means for controlling the back pressure in said exhaust system comprising valve means positioned therein downstream said catalytic reactor and muffler structure including an exhaust back pressure valve which is partially closed to keep the back pressure at an elevated level above that of the normal back pressure in said system without said valve when said engine is operating at the lower speeds above idle and which is opened at the higher speeds when mass flow rates are maximum when the pressure of the exhaust system without said valve is above the pressure maintained at the lower speeds.

References Cited

UNITED STATES PATENTS

| | | | |
|---|---|---|---|
| 2,807,930 | 10/1957 | Bratton | 60—30 |
| 3,116,725 | 1/1964 | Hadley | 60—30 |
| 3,220,805 | 11/1965 | Fowler, et al. | 60—30 |
| 2,725,948 | 12/1955 | Keene | 60—30 |
| 3,234,924 | 2/1966 | May | 60—30 |

RALPH D. BLAKESLEE, *Primary Examiner.*